United States Patent [19]

Motooka et al.

[11] Patent Number: 4,942,087
[45] Date of Patent: Jul. 17, 1990

[54] FILMS OF WHOLLY AROMATIC POLYESTER AND PROCESSES FOR PREPARATION THEREOF

[75] Inventors: Masanori Motooka; Kazuyuki Takimoto; Kunisuke Fukui, all of Yamaguchi, Japan

[73] Assignee: Mitsui Petrochemical Industries, Ltd., Tokyo, Japan

[21] Appl. No.: 285,015

[22] Filed: Dec. 16, 1988

[30] Foreign Application Priority Data

Dec. 28, 1987 [JP] Japan .............................. 62-33555
Oct. 26, 1988 [JP] Japan .............................. 63-270270
Oct. 26, 1988 [JP] Japan .............................. 63-270271

[51] Int. Cl.$^5$ ...................... C08G 63/02; C08G 69/08; B32B 27/36
[52] U.S. Cl. .................................. 428/332; 428/480; 528/190; 528/193; 528/194
[58] Field of Search ............... 528/176, 190, 193, 194; 264/331.21; 428/332, 480

[56] References Cited

U.S. PATENT DOCUMENTS 4,609,720  9/1986  Yoshimura et al. ................ 528/191

FOREIGN PATENT DOCUMENTS 0101843  9/1979  Poland.

Primary Examiner—Harold D. Anderson
Assistant Examiner—T. Mosley
Attorney, Agent, or Firm—Sherman and Shalloway

[57] ABSTRACT

Disclosed herein are (1) a film of a liquid crystalline wholly aromatic polyester which is non-oriented and transparent, which film can be prepared by dissolving a liquid crystalline wholly aromatic polyester in a solvent, casting the resulting solution to form a film and volatirizing the solvent from the film as cast and (2) a film of a liquid crystalline wholly aromatic polyester which is oriented and polarizing, which film can be prepared by orienting the above-mentioned non-oriented film by drawing or heating.

3 Claims, 3 Drawing Sheets

Driving frequency of 110Hz

FILMS OF WHOLLY AROMATIC POLYESTER AND PROCESSES FOR PREPARATION THEREOF

TECHNICAL FIELD OF THE INVENTION

The present invention relates to films of a wholly aromatic polyester. More particularly, it relates to a film of a liquid crystalline wholly aromatic polyester which is non-oriented and transparent and to a film of a liquid crystalline wholly aromatic polyester which is oriented, and polarizing. The invention further relates to processes for preparing such films.

BACKGROUND OF THE INVENTION AND RELATED ART

Wholly aromatic polyesters having various structures have been proposed and it is known that they have desirable properties including excellent heat resistance and mechanical strength. However, technology on films of wholly aromatic polyester films having such desirable properties, in particular on films of liquid crystalline wholly aromatic polyester, is scarcely known. Known in the art are only those which are not transparent and those composed of special polyesters, involving various problems discussed below.

Japanese Patent Publication No. 47-47870 states that wholly aromatic polyesters disclosed therein may be made into film. But it makes no mention of properties of any film and of any process of preparing films.

Japanese Patent Publication No. 53-45334 discloses a film obtained by frame-spraying particulate wholly aromatic polyester on a heated steel plate. The film so prepared is, however, poor in transparency because a melt of said particulate wholly aromatic polyester is anisotropic.

Japanese Patent Laid-open Publication No. 54-77691 discloses that a melt of wholly aromatic polyesters disclosed therein may be extrusion-or injection-molded to shaped articles, including films. The film so prepared is, however, poor in transparency and does not retain desirable properties such as high elongation at break inherently possessed by the polyesters.

Japanese Patent Laid-open Publication No. 54-46727 discloses a process for preparing a film in which a wholly aromatic polyester disclosed therein is melt-extruded through a slit to a film, followed by biaxial drawing of the film. Again, the film so prepared is poor in transparency.

Japanese Patent Laid-open Publication No. 58-104924 discloses that aromatic copolyesters having star-like branches disclosed therein may be cast to a film. But it makes no specific mention of any films, Further, the polyesters disclosed therein are quite specific and distinct from polyesters envisaged herein.

OBJECT OF THE INVENTION

The invention is to solve the problems associated with the prior art. An object of the invention is to provide a film of a wholly aromatic polyester which is excellently transparent and which has desirable mechanical properties such as tensile strength and toughness inherently possessed by the wholly aromatic polyester.

Another object of the invention is to provide a film of a wholly aromatic polyester which is polarizing and which has desirable mechanical properties such as tensile strength and toughness inherently possessed by the wholly aromatic polyester.

A further object of the invention is to provide processess for preparing the above-mentioned films.

SUMMARY OF THE INVENTION

According to one aspect of the invention there is provided a film of a liquid crystalline wholly aromatic polyester which is non-oriented and transparent.

Such a non-oriented transparent film can be prepared by a process according to the invention which comprises the steps of dissolving a liquid crystalline wholly aromatic polyester in a solvent, casting the resulting solution to form a film and volatilizing the solvent from the film as cast.

According to another aspect of the invention there is provided a film of a liquid crystalline wholly aromatic polyester which is oriented and polarizing.

Such an oriented, transparent and polarizing film can be prepared by a process according to the invention which comprises the steps of dissolving a liquid crystalline wholly aromtic polyester in a solvent, casting the resulting solution to form a film, volatilizing the solvent from the as cast film to provide a non-oriented film and orienting it by drawing or heating.

There can be mentioned the following three groups of liquid crystalline wholly aromatic polyesters which can be preferably used in the practice of the invention.

Preferred liquid crystalline wholly aromatic polyesters of the first group consist essentially of:

[A] structural units A derived from at least one aromatic hydroxycarboxylic acid and represented by the formula

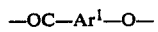  [I]

wherein $Ar^1$ is a divalent aromatic hydrocarbon group and at least 60 mol% of $Ar^1$ is p-phenylene;

[B] structural units B derived from at least one aromatic diol and represented by the formula [II]

  [II]

wherein $Ar^2$ is a divalent aromatic group selected from the group consisting of p-phenylene, 4,4'-diphenylene and naphthylenes;

[C] structural units C derived from 4,4'-dihydroxydiphenyl ether and represented by the formula [III]

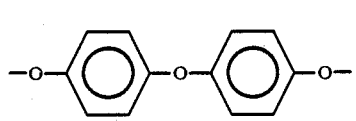  [III]

and

[D] structural units D derived from at least one aromatic dicarboxylic acid and represented by the formula [IV]

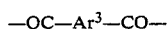  [IV]

wherein $Ar^3$ is a divalent aromatic group and at least 60 mol % of $Ar^3$ is p-phenylene; in such proportions that the amount of the units A is from 30 to 80 mol %, that of the unit B is from 1 to 20 mol %, that of the units C is from 2 to 32 mol % and that of the units D is from 10 to 35 mol %, with the proviso that the sum of moles of the units B and C is substantially equal to moles of units D.

Preferred liquid crystalline wholly aromatic polyesters of the second group are: melt-moldable and consist essentially of:

[F] structural units F represented by the formula [V]

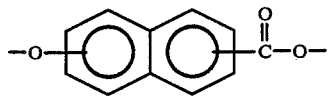  [V]

wherein the aromatic ring may have one or more substituents selected from the class consisting of alkyl groups having from 1 to 4 carbon atoms, alkoxy groups having from 1 to 4 carbon atoms and halogen atoms; and

[G] structural units G represented by the formula [VI]

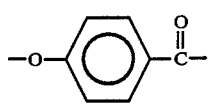  [VI]

wherein the aromatic ring may have one or more substituents selected from the class consisting of alkyl groups having from 1 to 4 carbon atoms, alkoxy groups having from 1 to 4 carbon atoms, in such proportions that the amount of the units F is from 10 to 90 mol % and that of the units G is from 10 to 90 mol %, said polyester being capable of forming a molten phase which is thermally tautomeric at a temperature of not higher than about 35° C.

Preferred liquid crystalline wholly aromatic polyesters of the third group are obtained by polycondensation

[H] at least one oxybenzoyl compound H represented by the formula [VII]

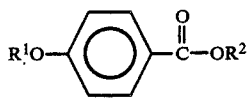  [VII]

wherein $R^1$ is selected from the group consisting of hydrogen, benzoyl and lower alkanoyls and $R^2$ is selected from the group consisting of hydrogen, phenyl benzoyl and lower alkanoyls; [I] at least one aromatic dicarbonyl compound I represented by the formula [VIII]

  [VIII]

wherein $R^3$ and $R^4$ are independently selected from the group consisting of hydrogen, phenyl benzoyl and lower alkanoyls, and the carbonyl groups are in m- or p-position from each other; and [J] at least one aromtic dioxy compound J represented by the formula [IX]

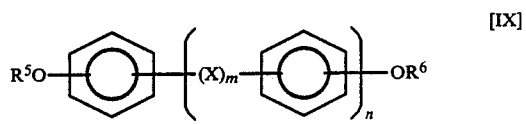  [IX]

wherein $R^5$ and $R^6$ are independently selected from the group consisting of hydrogen, benzoyl and lower alkanoyls, X is selected from the group consisting of —O—, —CO—, —S— and —SO$_2$—, m is 0 to 1, n is 0 or 1, and the oxy groups are m- or p-position from each other; in such proportions that the molar ratio of the compound I to the compound J is from 15:10 to 10:15 and the molar ratio of the compound H to the compound I is from 1:100 to 100:1

DETAILED DESCRIPTION OF THE INVENTION

Figure 1:
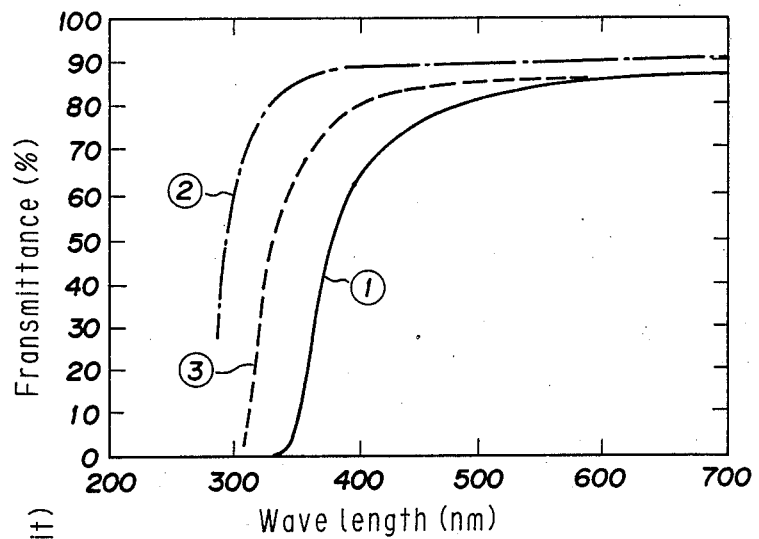
FIG. 1 is a graphical showing of % transmittance plotted against wave length on various transparent films, in which Curve ① relates to a non-oriented transparent film of a wholly aromatic polyester of Example 3 according to the invention, and Curves ② and ③ relate to commercially available transparent films of polycarbonate and polyethylene terephthalate, respectively.

The invention will now be described in detail.

Liquid crystalline wholly aromatic polyesters

As described herein above, preferred liquid crystalline wholly aromatic polyesters of the first group consist essentially of:

[A] structural units A derived from at least one aromatic hydroxycarboxylic acid and represented by the formula [I]

—OC—Ar$^1$—O—  [I]

wherein Ar¹ is a divalent aromatic hydrocarbon group and at least 60 mol % of Ar¹ is p-phenylene;

[B] structural units B derived from at least one aromatic diol and represented by the formula [II]

  [II]

wherein Ar² is a divalent aromatic group selected from the group consisting of p-phenylene, 4,4'-diphenylene and naphthylenes;

[C] structural units C derived from 4,4'-dihydroxydiphenyl ether and represented by the formula [III]

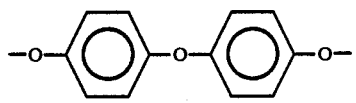 [III]

and

[D] structural units D derived from at least one aromatic dicarboxylic acid and represented by the formula [IV

 [IV]

wherein Ar³ is a divalent aromatic group and at least 60 mol % of Ar³ is p-phenylene; in such proportions that the amount of the units A is from 30 to 80 mol %, that of the units B is from 1 to 20 mol %, that of the units C is from 2 to 32 mol % and that of the units D is from 10 to 35 mol %, with the proviso that the sum of moles of the units B and C is substantially equal to moles of units D.

Such wholly aromatic polyesters which are liquid crystalline are described in Japanese Patent Application No. 62-56925 of MITSUI Petrochemical Industries Ltd.

The polyesters of this group preferably have a melt viscosity of from $10^2$ to $10^7$ poises, more preferably from $2 \times 10^2$ to $10^6$ poises, and the most preferably from $5 \times 10^2$ to $10^5$ poises as measured at a temperature higher than the melting point of the polyester by 30° C. with a shear rate of 100 sec$^{-1}$.

The polyesters of the first group are substantially linear and any of the units suitably end capped may come at the ends of the polymer chain. Thus, the polyesters may have either a terminal carboxyl group which may be esterified with a monohydric aliphatic lower alcohol such as methanol, ethanol and isopropanol or with a monohydric aromatic hydroxy compound such as phenol and cresol, or a terminal hydroxyl group which may be esterified with a monocarboxylic acid such as acetic, propionic and benzoic acids.

The polyesters of the first group normally have no glass transition temperature (Tg) that can be determined by means of a differential scanning calorimeter (DSC) and have a melting point (Tm) of normally from 200° to 450° C., preferably from 250° to 380° C., as determined by DSC.

The DSC determination of Tm of these polyesters is described in Japanese Patent Application No. 62-56925 referred to above.

Of the first group polyesters, particularly preferred are those consisting essentially of

[A-1] structural units A-1 derived from p-hydroxybenzoic acid and represented by the formula [I-1]

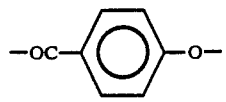 [I-1]

[B-1] structural units B-1 derived from hydroquinone and represented by the formula [II-1]

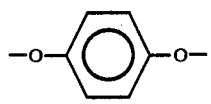 [II-1]

[C] structural units C derived from 4,4'-dihydroxydiphenyl ether and represented by the formula [III]

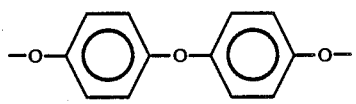 [III]

and [D-1] structural units D-1 derived from terephthalic acid and represented by the formula [IV-1]

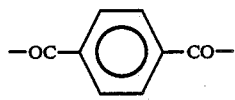 [IV-1]

in such proportions that the amount of the units A-1 is from 30 to 80% by mole, preferably from 40 to 70% by mole, that of the units B-1 is from 1 to 20% by mole, preferably from 3 to 16% by mole, that of the units C is from 1 to 32% by mole, preferably from 3 to 24% by mole and that of the units D-1 is from 10 35% by mole, preferably from 15 to 30 % by mole, based on the total moles of the units A-1, B-1, C and D-1, with the proviso that the sum of moles of the units B-1 and C is substantially equal to the moles of the units D-1.

Similar polyesters wherein a minor part, for example, up to 40% by mole of the units B-1 of the formula [II-1] is replaced with structural units B-2 of the formula [II-2]

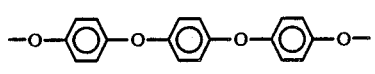 [II-2]

are also particularly preferred.

Preferred liquid crystalline wholly aromatic polyesters of the second group which can be used herein are melt-moldable and consist essentially of

[F] structural units F represented by the formula [V]

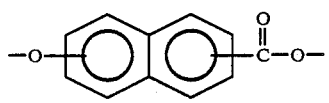 [V]

wherein the aromatic ring may have one or more substituents selected from the class consistig of alkyl groups having from 1 to 4 carbon atoms, alkoxy groups having from 1 to 4 carbon atoms and halogen atoms; and

[G] structural units G represented by the formula [VI]

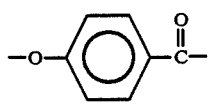

wherein the aromatic ring may have one or more substitutents selected from the class consisting of alkyl groups having from 1 to 4 carbon atoms, alkoxy groups having from 1 to 4 carbon atoms and halogen atoms, in such proportions that the amount of the units F is from 10 to 90 mol % and that of the units G is from 10 to 90 mol %, said polyester being capable of forming a molten phase which is thermally tautomeric at a temperature of not higher than about 350° C.

Such wholly aromatic polyesters which are liquid crystalline are described in detail in Japanese Patent Laid-open Publication No. 54-79691.

The polyesters of the second group normally have no gas transition temperature (Tg) that can be determined by means of a differential scanning calorimeter (DSC) and have a melting point (Tm) of normally from 250° to 450° C., preferably from 250° to 380° C., as determined by DSC.

Examples of particularly preferred polyesters of the second group include, for example,

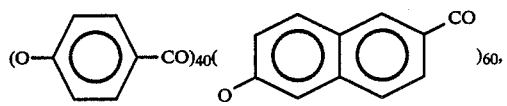

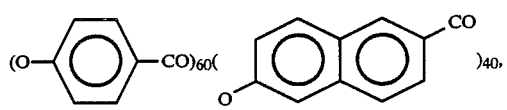

and

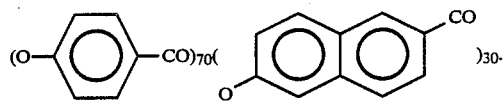

Preferred liquid crystalline wholly aromatic polyesters of the third group are obtained by polycondensation of:

[H] at least one oxybenzoyl compound H represented by the formula [VII]

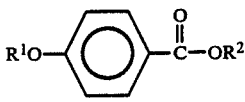

wherein $R^1$ is selected from the group consisting of hydrogen, benzoyl and lower alkanoyls and $R^2$ is selected from the group consisting of hydrogen, phenyl benzoyl and lower alkanoyls;

[I] at least one aromatic dicarbonyl compound I represented by the formula [VII]

wherein $R^3$ and $R^4$ are independently selected from the group consisting of hydrogen, phenyl benzoyl and lower alkanoyls, and the carbonyl groups are in m- or position from each other; and

[J] at least one aromatic dioxy compound J represented by the formula [IX]

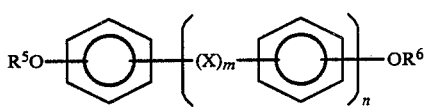

wherein $R^5$ and $R^6$ are independently selected from the group consisting of hydrogen, benzoyl and lower alkanoyls, X is selected from the group consisting of —O—, —CO—, —S— and —SO$_2$—, m is 0 to 1, n is 0 or 1, and the oxy groups are in m- or p-position from each other; in such proportions that the molar ratio of the compound I to the compound J is from 15:10 to 10:15 and the molar ratio of the compound H to the compound I is from 1:100 to 100:1.

Such wholly aromatic polyesters which are liquid crystalline are described in detail in Japanese Patent Publication No. 47-47870.

The polyesters of the third group normally have no glass transition temperature (Tg) that can be determined by means of a differential scanning calorimeter (DSC) and have a melting point (Tm) or normally from 250° to 450° C., preferably from 250° to 380° C., as determined by DSC.

Examples of particularly preferred polyesters of the third group include, for example,

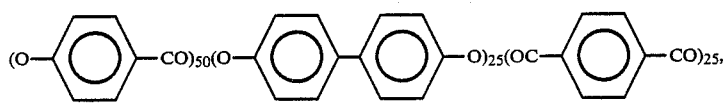

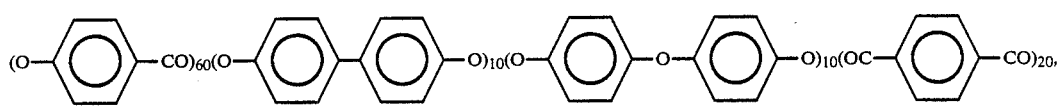

and

-continued

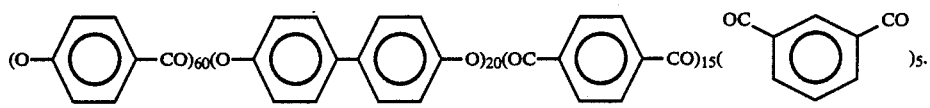

Examples of other known liquid crystalline wholly aromatic polyesters which can be used herein are listed in Table 1 below. Of those, the polyester of No. 4 is particularly preferred.

the resulting solution to form a film and volatilizing the solvent from the film as cast.

The solvents which can be used herein are those capable of dissolving the liquid crystalline wholly aromatic polyester at ambient or elevated temperatures. Examples of such solvents include, for example, trifluoroacetic acid, pentafluorophenol, p-fluorophenol and phenol. Of these, pentafluorophenol is particularly pre-

TABLE 1

| Mark | Formula | mp (°C.) | Reference JP-A |
|---|---|---|---|
| 1 | | 302 | 50-158695 |
| 2 | | | 53-65421 |
| 3 | | 316 | 54-30290 |
| 4 | | 305 | 54-50594 |
| 5 | | 273 | 55-144024 |
| 6 | | 303 | 56-10526 |
| 7 | | 250 | 55-50022 |
| 8 | | | 59-43021 |
| 9 | | 345 | 58-91721 |
| 10 | | 265 | 58-29819 |
| 11 | | 356 | 58-194919 |
| 12 | | 318 | 59-41329 |

JP-A; Japanese Patent Laid-open Publication No.

Non-oriented transparent film

According to the invention a film of a liquid crystalline wholly aromatic polyester which is non-oriented and transparent is prepared by dissolving a liquid crystalline wholly aromatic polyester in a solvent, casting ferred since it is low boiling and is easily volatilized from the as-cast film. The solvent for the polyester used may have incorporated with other solvents such as chloroform, methylene chloride and 1,1,2,2,-tetrachloroethane to an extent that the polyester is not precipitated during the subsequent casting step. So far as the solution is clear and uniform the concentration of the polyester is not very critical. From view points of processability and economy we prefer a concentration of from 0.1 to 10%, in particular from 0.5 to 5.0% by weight of polyester in solution.

The solution may be optionally filtered to removed fine dust involved therein, and is cast on a flat and uniform support made of Teflon, metal or glass to form a film. Volatilization of the solvent from the as-cast film and peeling off the film from the support provide a non-oriented transparent film according to the invention. If desired the peeled film may be dried by heating it at a temperature at least about 10° C. below the Tm of the polyester. The casting and heating steps mentioned above may be carried out by known methods using known apparatus.

In the film so prepared, molecular chains of the wholly aromatic polyester are substantially non-oriented, rendering the film transparent. Thus, a transparent film of a wholly aromatic polyester can be prepared by a casting process according to the invention. By the term "non-oriented or substantially non-oriented film" is meant that orientation of molecular chains of a polymer in the film is substantially at random.

A thickness of the non-oriented transparent film according to the invention can be controlled by casting conditions, and is normally from 1 to 1000 μm. The film normally has a transparency of from 60 to 95%, in particular from 80 to 90%, as measured by a spectrophotometer.

Polarizing film

The polarizing film according to the invention can be prepared by drawing the non-oriented film described herein normally at a draw ratio of at least 1.02 and preferably at a draw ratio from 1.04 to 1.20. With a draw ratio of less than 1.02, the film is not always uniformly drawn so that the polarizing property of the drawn film may become unreliable. Whereas with a draw ratio substantially in excess of 1.20, the film may be frequently broken.

Alternatively, the polarizing film according to the invention can also be prepared by heating the non-oriented film described herein normally at a temperature of from 100° to 350° C., and preferably at a temperature of from 100° to 300° C. With a heat treatment at a temperature of the film does not always become polarizing. Whereas with a temperature of substantially in excess of 300° C., the polarizing property of the heat treated film may frequently become less prominent.

The non-oriented film may be drawn while or after heating it, or it may be heated after being drawn to render the film polarizing.

Polarizing films prepared from the same non-oriented film by drawing the same at the same temperature generally have substantially the same tanδ, irrespective of the particular draw ratio. A polarizing film prepared by drawing and heating a non-oriented film generally has a decreasing storage modulus E' as the heating temperature increases. Effect of the draw ratio on the storage modulus E' appears only when the heating temperature exceeds a certain temperature e.g. about 120° C. in the case of the drawn and heated film composed of the wholly aromatic polyester of Example 7. The higher the draw ratio, the less the decrease in E' due to increase of the heating temperature.

Effect of the Invention

The non-oriented transparent film of a liquid crystalline polyester according to the invention is excellent in transparency, mechanical properties such as tensile strength and toughness, heat resistance and resistance to hydrolysis, and thus finds applications as condenser films, bases for transparent conductive films such as ITO films, bases for flexible printed boards and ultraviolet absorbing films. It is also useful in the production of polarizing films according to the invention. The polarizing film is useful as a phase-changing recording material in optical recording discs.

While the invention will be illustrated by the folowing Examples, it should be appreciated that the invention is in no way restricted to the Examples.

EXAMPLE 1

A copolyester consisting essentially of 60 mol % units derived from p-hydroxybenzoic acid, 10 mol % of units derived from 4,4'-dihydroxydiphenyl, 10 mol % of units derived from 4.4'-dihydroxydiphenyl ether and 20 mol % of units derived from terephthalic acid was prepared in the following manner.

A 500 ml reactor was charged with 108 g (0.6 mole) of p-acetoxybenzoic acid, 27 g (0.1 mole) of 4,4'-diacetoxydiphenyl, 28.6 g (0.1 mole) of 4,4'-diacetoxydiphenyl ether and 33,2 g (0.2 mole) of terephthalic acid and heated under stirring at a temperature of 275° C. for a period of 1 hour while distilling off acetic acid being formed. The mixture was then heated to a temperature of 350° C. over a hour and reacted at that temperature under a pressure of 0.5 mmHg for a further hour.

In differential scanning calorimetry the copolyester so prepared exhibited a melting point (Tm) of 312° C. in the first temperature-rising run, and that of 307° C. in the second temperature-rising run. A glass transition temperature (Tg) was not detected. The melt viscosity of the copolyester was about 2400 poises at a temperature of 342° C. and a shearing rate of 100 sec$^{-1}$.

Using the copolyester a non-oriented transparent film was prepared in the following manner.

A 200 ml Erlenmeyer flask with a ground stopper was charged with 3 g of the copolyester and 100 g of pentafluorophenol and heated on a hot plate of about 60° C. under stirring to provide a uniform solution. The solution was slightly brownish and viscous. It was suction-filtered through 0.22 μm "Fluoropore" (registered trade mark of a Teflon filter supplied by SUMITOMO Electric Ind. Ltd.) and degassed in a vacuum oven at a temperature of 60° C. under reduced pressure. The degassed solution was cast on a glass plate, and the solvent was volatilized in a vacuum oven at a temperature of 60° C. under reduced pressure. After confirmation of substantial removal of the solvent, the temperature of the oven was raised to 200° C., and the film was allowed to stand for further 3 hours in the oven at that temperature under reduced pressure. At the end of the period the film was taken out, allowed to cool and peeled off from the glass plate.

The film had a transparency of 82% or more for a ray in visible region of a wave length of more than 500 nm, as measured by means of a multiple-purpose self-recording spectrophotometer MPS-2000 Model, supplied by SHIMAZU Co., Ltd. It had a uniform thickness of about 25 μm. It was confirmed by a broad angle X-ray diffraction pattern of the film and polarizing microscopic observation of the film that the film was substantially non-oriented. The film had an elongation at break of 18% at a breaking stress of 1240 kg/cm$^2$, as measured by a tensile test in accordance of ASTM D 638-84.

COMPARATIVE EXAMPLE 1

The copolyester of Example 1 was made into a film by a melt extrusion process instead of by the casting process of Example 1. The melt extrusion was carried out using a T-die extruder under conditions including an extrusion temperature of 348° C. and a rate of extrusion of 4 cm/sec. The film so prepared was opaque.

EXAMPLE 2

A copolyester consisting essentially of 60 mol % units derived from p-hydroxybenzoic acid, 15 mol % of units derived from 4,4'-dihydroxydiphenyl, 5 mol % of units derived from 4.4'-dihydroxydiphenyl ether and 20 mol % of units derived from terephthalic acid was prepared in the following manner.

A 500 ml reactor was charged with 108 g (0.6 mole) of p-acetoxybenzoic acid, 40,6 g (0.15 mole) of 4,4'-diacetoxydiphenyl, 14.3 g (0.05 mole) of 4,4'-diacetoxydiphenyl ether and 33,2 g (0.2 mole) of terephthalic acid and heated under stirring at a temperature of 275° C. for a period of 1 hour while distilling off acetic acid being formed. The mixture was then heated to a temperature of 380° C. over a hour and reacted at that temperature under a pressure of 0.5 mmHg for 12 minutes.

In differential scanning calorimetry the copolyester so prepared exhibited a melting point (Tm) of 362° C. in the first temperature-rising run, and that of 360° C. in the second temperature-rising run. A glass transition temperature (Tg) was not detected. The melt viscosity of the copolyester was about 1800 poises at a temperature of 392° C. and a shearing rate of 100 sec$^{-1}$.

Using the copolyester a non-oriented transparent film was prepared in the following manner.

A 200 ml Erlenmeyer flask with a ground stopper was charged with 3 g of the copolyester and 100 g of pentafluorophenol and heated on a hot plate of about 60° C. under stirring to provide a uniform solution. The solution was slightly brownish and viscous. It was suction-filtered through 0.22 μm "Fluoropore" (registered trade mark of a Teflon filter supplied by SUMITOMO Electric Co. Ltd.) and degassed in a vacuum oven at a temperature of 60° C. under reduced pressure. The degassed solution was cast on a glass plate, and the solvent was volatilized in a vacuum oven at a temperature of 60° C. under reduced pressure. After confirmation of substantial removal of the solvent, the temperature of the oven was raised to 200° C., and the film was allowed to stand for further 3 hours in the oven at that temperature under reduced pressure. At the end of the period the film was taken out, allowed to cool and peeled off from the glass plate.

The film had a transparency of 87% or more for a light in visible region of a wave length of more than 500 nm, as measured as in Example 1. It had a uniform thickness of about 29 μm. It was confirmed by a broad angle X-ray diffraction pattern of the film and polarizing microscopic observation of the film that the film was substantially non-oriented. The film had an elongation at break of 22% at a breaking stress of 1530 kg/cm$^2$, as measured as in Example 1.

EXAMPLE 3

A copolyester consisting essentially of 60 mol % units derived from p-hydroxybenzoic acid, 5 mol % of units derived from hydroquinone. 15 mol % of units derived from 4.4'-dihydroxydiphenyl ether and 20 mol % of units derived from terephthalic acid was prepared in the following manner.

A 500 ml reactor was charged with 108 g (0.6 mole) of p-acetoxybenzoic acid, 9.7 g (0.05 mole) of p-acetoxybenzene, 42.9 g (0.15 mole) of 4,4'-diacetoxydiphenyl ether and 33,2 g (0.2 mole) of terephthalic acid and heated under stirring at a temperature of 275° C. for a period of 1 hour while distilling off acetic acid being formed. The mixture was then heated to a temperature of 350° C. over a hour and reacted at that temperature under a pressure of 0.5 mmHg for 12 minutes.

In differential scanning calorimetry the copolyester so prepared exhibited a melting point (Tm) of 307° C. in the first temperature-rising run, and that of 304° C. in the second temperature-rising run. A glass transition temperature (Tg) was not detected. The melt viscosity of the copolyester was about 2300 poises at a temperature of 334° C. and a shearing rate of 100 sec$^{-1}$.

Using the copolyester a non-oriented transparent film was prepared in the following manner.

A 200 ml Erlenmeyer flask with a ground stopper was charged with 2 g of the copolyester and 100 g of pentafluorophenol and heated on a hot plate of about 60° C. under stirring to provide a uniform solution. The solution was slightly brownish and viscous. It was suction-filtered through 0.22 μm "Fluoropore" (registered trade mark of a Teflon filter supplied by SUMITOMO Electric Co. Ltd.) and degassed in a vacuum oven at a temperature of 60° C. under reduced pressure. The degassed solution was cast on a glass plate, and the solvent was volatilized in a vacuum oven at a temperature of 60° C. under reduced pressure. After confirmation of substantial removal of the solvent, the temperature of the oven was raised to 200° C., and the film was allowed to stand for further 3 hours in the oven at that temperature under reduced pressure. At the end of the period the film was taken out, allowed to cool and peeled off from the glass plate.

The film had a transparency of 84% or more for a light in visible region of a wave length of more than 500 nm, as measured as in Example 1. It had a uniform thickness of about 12 μm. It was confirmed by a broad angle X-ray diffraction pattern of the film and polarizing microscopic observation of the film that the film was substantially non-oriented. The film had an elongation at break of 15% at a breaking stress of 1250 kg/cm$^2$, as measured as in Example 1.

Change of transmittance with wave length was determined on the transparent film of this Example, using a multiple-purpose self-recording spectrophotometer, Model MPS-2000, supplied by SHIMAZU Works Co., Ltd. The result is shown by Curve 1 in FIG. 1. For comparison purpose, on well known transparent films of polycarbonate (PC) and polyethylene terephthalate, dependencies of transmittance on wave length are shown by Curves 2 and 3 in the same figure, respectively. It is revealed from FIG. 1 that the non-oriented, transparent film according to the invention has a transparency (% transmittance) of at least 80% for a ray in visible region, although it is opaque for a ray in ultraviolet region.

EXAMPLE 4

A copolyester consisting essentially of 50 mol % units derived from p-hydroxybenzoic acid, 6 mol % of units derived from hydroquinone, 19 mol % of units derived from 4.4'-dihydroxydiphenyl ether and 25 mol % of units derived from terephthalic acid was prepared in the following manner.

A 500 ml reactor was charged with 90 g (0.5 mole) of p-acetoxybenzoic acid, 11.6 g (0.06 mole) of p-acetoxybenzene, 54.3 g (0.19 mole) of 4,4'-diacetoxydiphenyl ether and 41.5 g (0.19 mole) of terephthalic acid and heated under stirring at a temperature of 275° C. for a period of 1 hour while distilling off acetic acid being formed. The mixture was then heated to a temperature of 350° C. over a hour and reacted at that temperature under a pressure of 0.5 mmHg for one hour.

In differential scanning calorimetry the copolyester so prepared exhibited a melting point (Tm) of 328° C. in the first temperature-rising run, and that of 324° C. in the second temperature-rising run. A glass transition temperature (Tg) was not detected. The melt viscosity of the copolyester was about 3300 poises at a temperature of 354° C. and a shearing rate of 100 sec$^{-1}$.

Using the copolyester a non-oriented transparent film was prepared in the following manner.

A 200 ml Erlenmeyer flask with a ground stopper was charged with 3 g of the copolyester and 100 g of pentafluorophenol and heated on a hot plate of about 60° C. under stirring to provide a uniform solution. The solution was slightly brownish and viscous. It was suction-filtered through 0.22 $\mu$m "Fluoropore" (registered trade mark of a Teflon filter supplied by SUMITOMO Electric Co. Ltd.) and degassed in a vacuum oven at a temperature of 60° C. under reduced pressure. The degassed solution was cast on a glass plate, and the solvent was volatilized in a vacuum oven at a temperature of 60° C. under reduced pressure. After confirmation of substantial removal of the solvent, the temperature of the oven was raised to 200° C., and the film was allowed to stand for further 3 hours in the oven at that temperature under reduced pressure. At the end of the period the film was taken out, allowed to cool and peeled off from the glass plate.

The film had a transparency of 81% for a light in visible region of a wave length of more than 500 nm, as measured as in Example 1. It had a uniform thickness of about 25 $\mu$m. It was confirmed by a broad angle X-ray diffraction pattern of the film and polarizing microscopic observation of the film that the film was substantially non-oriented. The film had an elongation at break of 19% at a breaking stress of 1420 kg/cm$^2$, as measured as in Example 1.

EXAMPLE 5

Using "Vectra A950" wholly aromatic polyester pellets which was supplied by Hoechst-Celanese Co. and consisted essentially of 73 mol % of units derived from p-hydroxybenzoic acid and 27 mol % of units derived from 6-hydroxy-2-naphthoic acid, a non-oriented cast film was prepared as in Example 1. The "Vectra" is a registered trade mark of the above-mentioned company for their wholly aromatic polyesters. A solution of "Vectra A950" was prepared in the manner as described in Example 1, cast on a glass plate, and the solvent was volatilized in a vacuum oven at a temperature of 60° C. under reduced pressure. After confirmation of substantial removal of the solvent, the temperature of the oven was raised to 100° C., and the film was allowed to stand for further 2 hours in the oven at that temperature under reduced pressure. At the end of the period the film was taken out, allowed to cool and peeled off from the glass plate.

The film had a transparency of 88% or more for a light in visible region of a wave length of more than 500 mn, as measured as in Example 1. It had a uniform thickness of about 20 $\mu$m. It was confirmed by a broad angle X-ray diffraction pattern of the film and polarizing microscopic observation of the film that the film was substantially non-oriented. The film had an elongation at break of 17% at a breaking stress of 1530 kg/cm$^2$, as measured as in Example 1.

COMPARATIVE EXAMPLE 2

The copolyester of Example 5 was made into a film by a melt extrusion process instead of by the casting process of Example 5. The melt extrusion was carried out using a T-die extruder under conditions including an extrusion temperature of 320° C. and a rate of extrusion of 6 cm/sec. The film so prepared was opaque.

EXAMPLE 6

Using "Ekonol E6000" wholly aromatic polyester pellets which was supplied by SUMITOMO Chemical Industries Co. Lid. and consisted essentially of 60 mol % of units derived from p-hydroxybenzoic acid, 20 mol % of 4.4'-dihydroxydiphenylene, 15 mol % of units derived from terephthalic acid and 5 mol % of units derived from isophthalic acid, a non-oriented cast film was prepared as in Example 1. The "Ekonol" is a registered trade mark of the above-mentioned company for their wholly aromatic polyesters. A solution of "Ekonol 6000" was prepared in the manner as described in Example 1, cast on a glass plate, and the solvent was volatilized in a vacuum oven at a temperature of 60° C. under reduced pressure. After confirmation of substantial removal of the solvent, the temperature of the oven was raised to 100° C., and the film was allowed to stand for further 2 hours in the oven at that temperature under reduced pressure. At the end of the period the film was taken out, allowed to cool and peeled off from the glass plate.

The film had a transparency of 81% or more for a light in visible region of a wave length of more than 500 nm, as measured as in Example 1. It had a uniform thickness of about 25 $\mu$m. It was confirmed by a broad angle X-ray diffraction pattern of the film and polarizing microscopic observation of the film that the film was substantially non-oriented. The film had an elongation at break of 19% at a breaking stress of 1670 kg/cm$^2$, as measured as in Example 1.

COMPARATIVE EXAMPLE 3

The copolyester of Example 6 was made into a film by a melt extrusion process instead of by the casting process of Example 6. The melt extrusion was carried out using a T-die extruder under conditions including an extrusion temperature of 348° C. and a rate of extrusion of 4 cm/sec. The film so prepared was opaque.

EXAMPLE 7

"Vectra A950" wholly aromatic polyester pellets which was supplied by Hoechst-Celanese Co. and consisted essentially of 73 mol % of units derived from p-hydroxybenzoic acid and 27 mol % of units derived from 6-hydroxy-2-naphthoic acid, was dissolved in pentafluorophenol to provide a uniform solution. The "Vectra" is a registered trade mark of the above-mentioned company for their wholly aromatic polyesters. The solution of "Vectra A950" was filtered and cast on a glass plate, and thereafter the solvent was volatilized at a temperature of about 60° C. under a nitrogen stream of a reduced pressure. In order to completely remove the solvent the film was further heated at a temperature of 100° C. under a reduced pressure for a period of 2 hours. The film was allowed to cool and peeled off from the glass plate.

The film so prepared had a thickness of about 20 μm. It was confirmed by a broad angle X-ray diffraction pattern of the film and observation of the film with a polarizing microscope having perpendicularly intersecting Nicols (cross polarizers) indicated that the film was substantially non-oriented.

Figure 2:
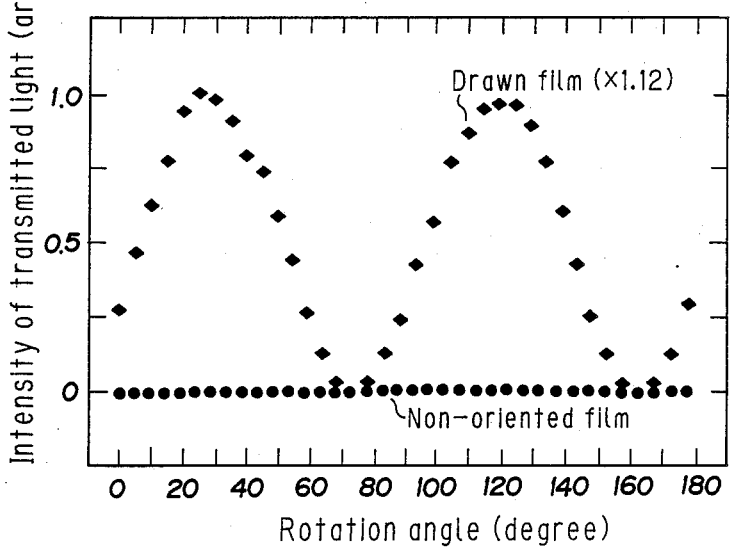
FIG. 2 illustrates a relationship between rotation angle and intensity of transmitted light on the undrawn non-oriented film and drawn polarizing film having been drawn at a draw ratio of 1.12 of Example 7.

The non-oriented film was uniaxially drawn at a draw ratio of 1.12. Observation of the drawn film with a polarizing microscope having perpendicularly intersecting Nicols indicated a polarization as shown in FIG. 2. In FIG. 2, the abscissa represents rotation angle in degree while the ordinate represents intensity of transmitted light in arbitrary unit, and the solid quadrilateral and circle marks relate the drawn and as-cast films, respectively. It is understood from a distribution of transmitted light intensity between an angle of polarization and an angle opposite thereto on the drawn film that molecular chains of the wholly aromatic polyester are oriented substantially in parallel to the direction of drawing.

The non-oriented film was uniaxially drawn at a draw ratio of 1.06. The drawn film exhibited a similar polarization.

Figure 3:
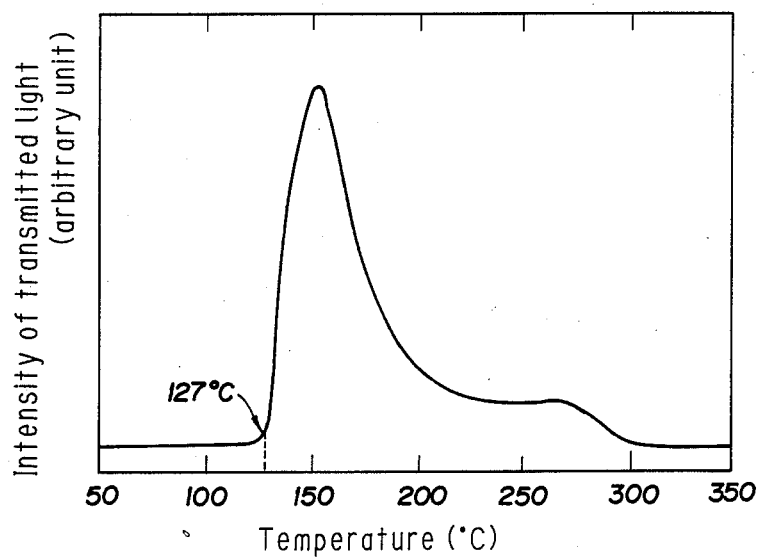
FIG. 3 is a graph showing intensity of transmitted light plotted against heating temperature on heated polarizing films according to the invention.

Heat-treatment of the non-oriented films was carried out under various temperature conditions. On the heat-treated films the intensity of transmitted light was observed in the same manner as described above. FIG. 3 is a graph showing the intensity of transmitted light in arbitrary unit under cross polarizers plotted against the heating temperature. It is revealed from FIG. 3 that in the case of the non-oriented film of this Example a polarizing property begins to sharply appear when the heating temperature exceeds 127° C. Incidentally, when a plate injection molded from the wholly aromatic polyester of this Example was heat-treated and tested in the same manner, an abrupt change of the intensity of transmitted light was observed at a temperature of 330° C.

Figure 4:
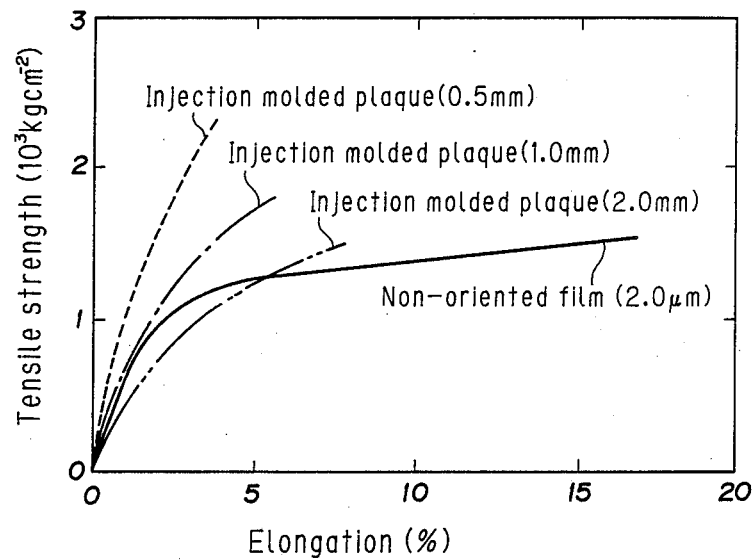
FIG. 4 depicts elongation at break of the non-oriented film of Example 7 according to the invention and that of injection molded films.

The non-oriented film of this Example was tested for the elongation at break. The result is shown in FIG. 4. FIG. 4 also depicts the elongation at break of injection molded films of the same polyester having indicated thicknesses. The non-oriented film according to the invention has an increased elongation at break when compared with injection molded films of the same polyester. This is believed because the non-oriented film according to the invention prepared by a casting process has a uniform structure free from a non-uniform structure such as a skin structure associated with injection molded plates.

Figure 5:
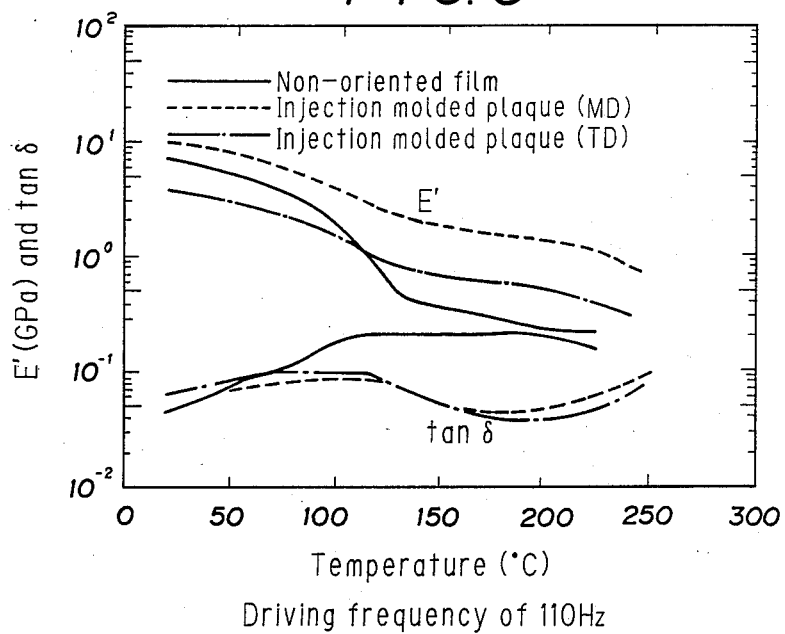
FIG. 5 shows temperature dependencies of storage modulus E' and tanδ of the non-oriented film of Example 7 together with those of an injection molded plate in machine and transverse direction, in which the solid lines relate to the non-oriented film according to the invention, the dotted lines relate to MD of the injection molded plate, and the alternate long and short dush lines relate to TD of the injection molded plate.

On the non-oriented film of a dimension of 80 mm×5 mm×20 μm, temperature dependencies of the storage modulus E' in GPa and tanδ were determined. The results are shown in FIG. 5 by solid lines. Further, on an injection molded plaque of the same polyester having a dimension of 130 mm×120 mm×2 mm, temperature dependencies of the storage modulus E' in GPa and tanδ were determined in both machine direction (MD) and transverse direction (TD). The results are also shown in FIG. 5 by dotted (MD) and chain (TD) lines, respectively. As seen from FIG. 5, the storage modulus E' of the injection molded plaque greatly differ in MD and TD due to anisotropic melt flow in an injection mold, although temperature dependencies of E' in MD and TD are substantially the same. Whereas the storage modulus E' of the non-oriented film is plane-isotropic and greatly differs from both the MD and TD storage moduli of the injection molded plaque. The non-oriented film further differs from the injection molded plaque in tanδ and its dependency on temperature. It is believed that the micro-structure of the non-oriented film is different from a solid structure of the injection molded plaque which has appeared via a liquid crystalline structure as a result of melt flow.

Figure 6:
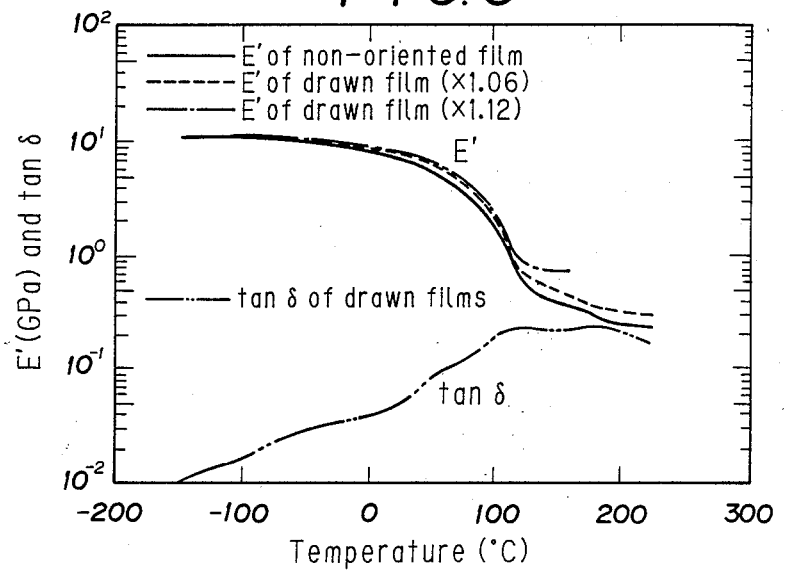
FIG. 6 shows temperature dependencies of E' and tanδ of the polarizing films of Example 7 together with a temperature dependency of E' of the non-oriented film of Example 7, in which the solid, dotted, alternate long and short dash and alternate long and two short dashes lines depict E' of the non-oriented film, E' of the polarizing film having been drawn at a draw ratio of 1.06, E' of the polarizing film have been drawn at a draw ratio of 1.12 and tanδ of both the polarizing films, respectively.

FIG. 6 shows temperature dependencies of E' and tanδ of the polarizing films of Example 7 together with a temperature dependency of E' of the non-oriented film of Example 7, in which the solid, dotted, alternate long and short dush and alternate long and two short dushes lines depict E' of the non-oriented film, E' of the polarizing film having been drawn at a draw ratio of 1.06, E' of the polarizing film having been drawn at a draw ratio of 1.12 and tanδ of both the polarizing films, respectively, On the tested polarizing films having been drawn at draw ratios 1.06 and 1.12, tanδ was unchanged irrespective of the draw ratio.

EXAMPLE 8 TO 11

The non-oriented films of Examples 1 to 4 were drawn as in Example 7. The drawn films were polarizing as in Example 7.

The non-oriented films of Examples 1 to 4 were heated as in Example 7. The heated films were polarizing as in Example 7.

What is claimed is:

1. A film of a liquid crystalline wholly aromatic polyester which is non-oriented and transparent having a thickness of from 1 to 1,000 μm and a transparency of from 60 to 95% wherein said liquid crystalline wholly aromatic polyester consists essentially of:

[A] structural units A derived from at least one aromatic hydroxycarboxylic acid and represented by the formula $$—OC—Ar^1—O— \quad [I]$$

wherein $Ar^1$ is a divalent aromatic hydrocarbon group and at least 60 mol % of $Ar^1$ is p-phenylene;

[B] structural units B derived from at least one aromatic diol and represented by the formula $$—O—Ar^2—O— \quad [II]$$

wherein $Ar^2$ is a divalent aromatic group selected from the group consisting of p-phenylene, 4,4'-diphenylene and naphthylenes;

[C] structural units C derived from 4,4'-dihydroxydiphenyl ether and represented by the formula

[III]

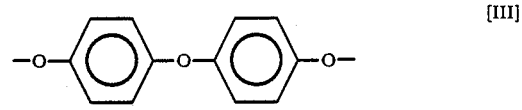

and

[D] structural units D derived from at least one aromatic dicarboxylic acid and represented by the formula —OC—Ar³—CO— [IV]

wherein Ar³ is a divalent aromatic group and at least 60 mol % of Ar³ is p-phenylene; in such proportions that the amount of the units A is from 30 to 80 mol %, that of the units B is from 1 to 20 mol %, that of the units C is from 2 to 32 mol % and that of the units D is from 10 to 35 mol %, with the proviso that the sum of moles of the units B and C is substantially equal to moles of units D.

2. A film of a liquid crystalline wholly aromatic polyester which is non-oriented and transparent having a thickness of from 1 to 1,000 μm and a transparency of from 60 to 95% wherein said liquid crystalline wholly aromatic polyester is melt-moldable and consists essentially of:

[F] structural units F represented by the formula

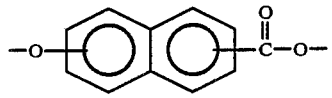  [V]

wherein the aromatic ring may have one or more substituents selected from the class consisting of alkyl groups having from 1 to 4 carbon atoms, alkoxy groups having from 1 to 4 carbon atoms and halogen atoms; and

[G] structural units G represented by the formula

  [VI]

wherein the aromatic ring may have one or more substituents selected from the class consisting of alkyl groups having from 1 to 4 carbon atoms, alkoxy groups having from 1 to 4 carbon atoms and halogen atoms, in such proportions that the amount of the units F is from 10 to 90 mol % and that of the units G is from 10 to 90 mol %, said polyester being capable of forming a molten phase which is thermally tautomeric at a temperature of not higher than about 350° C.

3. A film of a liquid crystalline wholly aromatic polyester which is non-oriented and transparent having a thickness of from 1 to 1,000 μm and a transparency of from 60 to 95% wherein said liquid crystalline wholly aromatic polyester is obtained by polycondensation of:

[H] at least one oxybenzoyl compound H represented by the formula

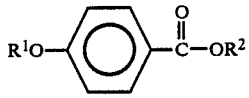  [VII]

wherein $R^1$ is selected from the group consisting of hydrogen, benzoyl and lower alkanoyls and $R^2$ is selected from the group consisting of hydrogen, phenyl benzoyl and lower alkanoyls;

[I] at least one aromatic dicarbonyl compount I represented by the formula

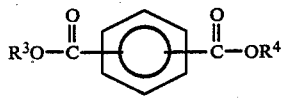  [VIII]

wherein $R^3$ and $R^4$ are independently selected from the group consisting of hydrogen, phenyl benzoyl and lower alkanoyls, and the carbonyl groups are in m- or p-position from each other; and

[J] at least one aromatic dioxy compound J represented by the formula

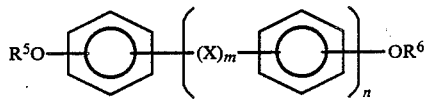  [IX]

wherein $R^5$ and $R^6$ are independently selected from the group consisting of hydrogen, benzoyl and lower alkanoyls, X is selected from the group consisting of —O—, —CO—, —S— and —SO₂—, m is 0 or 1, n is 0 or 1, and the oxy groups are in m- or p-position from each other; in such proportions that the molar ratio of the compound I to the compound J is from 15:10 to 10:15 and the molar ratio of the compound H to the compound I is from 1:100 to 100:1.

* * * * *

UNITED STATES PATENT AND TRADEMARK OFFICE
CERTIFICATE OF CORRECTION

PATENT NO. : 4,942,087

DATED : July 17, 1990

INVENTOR(S) : Masanori MOTOOKA; Kazuyuki TAKIMOTO; and Kunisuke FUKUI

It is certified that error appears in the above-identified patent and that said Letters Patent is hereby corrected as shown below:

On the Title Page of the Patent, under "Foreign Application Priority Date", change "Japan....62-33555" to --Japan....62-335551--;

Column 1, line 39, change "extrusion-or" to --extrusion- or--;
Column 1, line 44, change "54-46727" to --56-46727--;
Column 2, line 4, change "sess" to --ses--;
Column 3, line 39, change "35°C" to --350°C--;
Column 5, line 24, change"[IV" to --[IV]--;
Column 6, line 38, change "10 35%" to --10 to 35%--;
Column 7, line 10, change "stitutents" to --stituents--;
Column 7, line 23, change "gas" to --glass--;
Column 8, line 11, change "[VII]" to --[VIII]--;
Column 8, line 22, change "position" to --p-position--;
Column 8, line 35, change "to" to --or--;
Column 8, line 47, change "or" to --of--;
Column 11, line 12, change "removed" to --remove--;

Signed and Sealed this

Thirteenth Day of October, 1992

*Attest:*

DOUGLAS B. COMER

*Attesting Officer*     *Acting Commissioner of Patents and Trademarks*